Patented Apr. 29, 1941

2,240,151

UNITED STATES PATENT OFFICE 2,240,151

BRONZING LACQUER

Herbert L. Wampner, Terre Haute, Ind., assignor to Commercial Solvents Corporation, Terre Haute, Ind., a corporation of Maryland No Drawing. Application May 1, 1940, Serial No. 332,688

9 Claims. (Cl. 134—79)

My invention relates to cellulose ester bronzing lacquers and more specifically to such bronzing lacquers having improved leafing properties.

Cellulose ester bronzing lacquers constitute any of the ordinary types of cellulose ester lacquers containing metallic pigments termed "bronze powders." The common bronze powders available today, and the type to which my present invention applies, are those in which the metallic particles are not granular in nature, but are of a flake-like or flat sheet-like character. Bronze powders are produced in this form with the intent that the individual particles will orient themselves in the applied film of bronzing lacquer with the plane surfaces of the flakes parallel to the surface of the applied film, thus producing, in effect, a continuous plane metallic surface. This desired orientation of the bronze powder in the applied film is termed "leafing."

The leafing of bronze powders in various bronzing liquids has been found to differ to a marked extent with the characteristics of the bronzing liquid. Varnish bases have in general produced the most satisfactory leafing, and cellulose ester lacquers have been relatively unsatisfactory in this respect. In view of the rapid drying qualities of cellulose ester lacquers, it has been desirable to improve the leafing properties of bronze powders in such media, but little progress has been made in this respect. A particularly bad feature of cellulose ester bronzing lacquers has been that the initial leafing properties, secured immediately after mixing the bronze powder with the clear lacquer, are very quickly lost, so that it has been necessary to mix small quantities of the bronzing lacquers at very frequent intervals.

It is an object of my invention to provide cellulose ester bronzing lacquers of improved leafing properties, and to provide such lacquers which will retain satisfactory leafing properties for practical working periods.

The bronzing lacquers of my present invention constitute cellulose ester bronzing lacquers of standard formulation, including very small amounts of leafing agents to improve the leafing properties of the lacquers, and to provide satisfactory leafing properties for a practical interval of time after admixture of the bronze powder with the clear lacquer.

The compounds which I have discovered to possess the properties of leafing agents for cellulose-ester bronzing lacquers, constitute the aliphatic hydroxy-amines. As examples of compounds of this class, there may be mentioned monoethanolamine, triethanolamine, triisopropanolamine, 2-amino-2-methylpropanol, 2-amino-2-methyl-1,3-propanediol, and trimethylolaminomethane.

Te leafing agents of my present invention may be incorporated in the clear lacquer to which the bronze powder is subsequently to be added, or may be added at the same time that the bronze powder is incorporated in the lacquer. In general I prefer the former procedure, although it is obvious that various equivalent methods may be employed for incorporating the leafing agents in the bronzing lacquer. For example, the leafing agent may suitably be adsorbed on the bronze powder, either in the course of its manufacture, or subsequently. Any such modified procedure may be employed if desired, but my invention will be specifically illustrated with reference to the simple procedure of adding the leafing agent to the clear lacquer at the time of its initial formulation.

Very small amounts of the leafing agents of my present invention may be utilized to improve the leafing properties of the bronzing lacquers. The concentration to be employed is not critical, but I prefer in general to employ from approximately 0.1% to approximately 0.4% based on the weight of the bronzing lacquer. Most of the compounds of the class described above have limited solubility in bronzing lacquers, and in many cases less than 0.4% by weight will actually dissolve in the lacquer. A slight excess of undissolved material, however, is not particularly undesirable, as it is not apparent in the film due to the presence of the bronze powder.

The leafing agents of my present invention may be utilized in conjunction with cellulose ester bronzing lacquers of any standard formulation. Various cellulose esters of organic acids, such as cellulose acetate, cellulose acetobutyrate, and the like, may be utilized as the film-forming ingredient, if desired. My invention is particularly adapted for use in conjunction with nitrocellulose bronzing lacquers, and will be specifically illustrated with respect to such lacquers.

Any of the known types of bronze powders, such as aluminum bronze or bronze powders prepared from copper, brasses, and the like, may be employed. However, as has been previously noted, all such powders should be of the flake type, which is adapted to proper leafing. Suitable bronze powders for use in the present invention may be prepared, for example, by the process of U. S. Patent No. 2,002,891 of E. J. Hall.

In a commercial process of this character, the metal is reduced to flake-like particles by impact in a ball mill, and a lubricating agent or leafing agent such as stearic acid or palmitic acid is incorporated in the powder during reduction or during subsequent polishing. My invention is particularly adapted to use in conjunction with aluminum or aluminum alloy bronze powders in which a small amount of such an acid has been incorporated.

Standard solvents and diluents for a cellulose ester lacquers may be employed in conjunction with my invention, but I prefer to employ solvents and diluents having relatively high surface tensions. Solvent mixtures prepared from ingredients having high surface tensions, such as esters, ketones, and coal-tar hydrocarbons, have been found to produce better initial leafing properties than solvent mixtures including ingredients of substantially lower surface tensions, such as alcohols and petroleum hydrocarbons. The improved initial leafing with solvent mixtures of high surface tension has been found in the past to decrease very rapidly upon aging, after admixture of the bronze powder with the clear lacquer. However, I have found that my leafing agents serve to retain the improved leafing properties, for practical time intervals, in lacquers containing such high-surface tension solvents and diluents. Particularly satisfactory results are obtainable by the use of my leafing agents in conjunction with lacquers in which nitroparaffins such as nitromethane, nitroethane, 1-nitropropane, 2-nitropropane, 1-nitrobutane, and the like, constitute major solvent ingredients. These solvents have higher surface tensions than practically any of the common cellulose ester solvents, and when used in conjunction with my leafing agents produce bronzing lacquers of excellent leafing properties and satisfactory working time before the leafing properties are lost.

Other standard ingredients of cellulose ester bronzing lacquers may be incorporated in the lacquers for use with my leafing agents, in accordance with standard formulation procedure. Any of the standard plasticizers, resins, and the like, may be employed, but I prefer to employ such ingredients which are not substantially acidic in nature. This is particularly true with respect to resins, and I prefer, for this reason, to employ synthetic resins, such as alkyd or phenol-aldehyde resins which are in general more neutral in reaction than such materials as ester gum and natural resins. It is possible that the acidity in the resin or other ingredient of the lacquer may serve to neutralize the basic character of my leafing agents, and that when so neutralized, they are in some way deactivated. However, this effect is not very great, and my leafing agents will produce improved leafing properties in lacquers containing all types of standard ingredients, including, for example, acidic samples of ester gum.

My invention may be further illustrated by the following specific examples:

*Example I*

A lacquer was prepared containing 10 parts by weight of ¼ sec. nitrocellulose, 10 parts by weight of ester gum, and 5 parts by weight of dibutyl phthalate in 100 parts by weight of a solvent mixture of the following composition: butyl acetate 25% by volume, ethyl acetate 15% by volume, ethyl alcohol 5%, toluol 55% by volume.

Aluminum bronze powder was added to two samples of the resulting clear lacquer in a concentration of approximately 8% by weight, and to one of these samples approximately 0.3% by weight of 3-amino-3-methyl-4-heptanol was added. Each of the samples of bronzing lacquer was thoroughly mixed, allowed to stand for two hours, remixed and applied to metal panels. The sample containing 3-amino-3-methyl-4-heptanol showed excellent leafing properties, whereas the sample without any leafing agent showed practically no leafing.

The same procedure described above was employed for testing the following leafing agents: Monoethanolamine, triethanolamine, trimethylolaminomethane, triisopropanolamine, 2-amino-2-methylpropanol, and 2-amino-2-methyl-1,3-propanediol. In each case the bronzing lacquer containing the leafing agent showed a marked improvement in leafing properties over the bronzing lacquer without any leafing agent.

*Example II*

A clear lacquer was prepared as in Example I, employing the same proportion of a phenolaldehyde resin (Bakelite X R 3180) in place of ester gum. Aluminum bronze powder was added to two samples of this lacquer in a concentration of approximately 8% by weight, and trimethylolaminomethane was added to one sample in a concentration of approximately 0.3% by weight. Each of the samples of bronzing lacquer was thoroughly mixed, allowed to stand for 4 hours, remixed, and applied to metal panels. The sample containing trimethylolaminomethane showed satisfactory leafing, whereas the sample without any leafing agent showed practically no leafing whatever.

*Example III*

A lacquer was prepared containing 10 parts by weight of ¼ sec. nitrocellulose, 10 parts by weight of ester gum, and 5 parts by weight of dibutyl phthalate in 100 parts by weight of a solvent mixture of the following composition: Nitromethane 20% by volume, 1-nitropropane 20% by volume, anhydrous ethanol 10% by volume, toluol 50% by volume.

Aluminum bronze powder was added to two samples of the above lacquer in a concentration of approximately 8% by weight, and 2-amino-2-methyl-1,3-propanediol was added to one of these samples in a concentration of approximately 0.3% by weight. Each of the resulting lacquers was thoroughly mixed, allowed to stand for 7 hours, remixed, and applied to metal panels. The sample containing the 2-amino-2-methyl-1,3-propanediol showed satisfactory leafing properties, whereas the sample containing no leafing agent showed practically no leafing whatever.

It is to be understood, of course, that the above examples are merely illustrative and do not limit the scope of my invention. As has previously been pointed out, the formulation of the bronzing lacquers may be varied in numerous ways in accordance with standard formulation procedure, and other leafing agents of the class previously described may be substituted for those specifically employed in the examples. In general it may be said that the use of any equivalents or modifications of procedure which would naturally occur to one skilled in the art, is included within the scope of my invention.

My invention now having been described, what I claim is:

1. A cellulose ester bronzing lacquer containing a flake-like bronze powder and a leafing agent comprising an aliphatic hydroxyamine.

2. A cellulose ester bronzing lacquer containing a flake-like aluminum bronze powder and a leafing agent comprising 3-amino-3-methyl-4-heptanol.

3. A cellulose ester bronzing lacquer containing a flake-like aluminum bronze powder and a leafing agent comprising 2-amino-2-methyl-1,3-propanediol.

4. A cellulose ester bronzing lacquer containing a flake-like aluminum bronze powder and a leafing agent comprising trimethylolaminomethane.

5. A cellulose ester bronzing lacquer containing a solvent component of high surface tension, a flake-like bronze powder, and a leafing agent comprising an aliphatic hydroxyamine.

6. A cellulose ester bronzing lacquer containing a nitroparaffin as a major solvent constituent, a flake-like aluminum bronze powder, and a leafing agent comprising an aliphatic hydroxyamine.

7. A cellulose ester bronzing lacquer containing a nitroparaffin as a major solvent constituent, a flake-like aluminum bronze powder, and a leafing agent comprising 3-amino-3-methyl-4-heptanol.

8. A cellulose ester bronzing lacquer containing a nitroparaffin as a major solvent constituent, a flake-like aluminum bronze powder, and a leafing agent comprising 2-amino-2-methyl-1,3-propanediol.

9. A cellulose ester bronzing lacquer containing a nitroparaffin as a major solvent constituent, a flake-like aluminum bronze powder, and a leafing agent comprising trimethylolaminomethane.

HERBERT L. WAMPNER.